US007524579B1

(12) United States Patent
Jow et al.

(10) Patent No.: US 7,524,579 B1
(45) **Date of Patent: *Apr. 28, 2009**

(54) NON-AQUEOUS SOLVENT ELECTROLYTE BATTERY WITH ADDITIVE ALKALI METAL SALT OF A MIXED ANHYDRIDE COMBINATION OF OXALIC ACID AND BORIC ACID

(75) Inventors: T. Richard Jow, Potomac, MD (US); Shengshui Zhang, Olney, MD (US); Kang Xu, North Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/642,655

(22) Filed: Dec. 21, 2006

Related U.S. Application Data

(62) Division of application No. 10/625,686, filed on Jul. 24, 2003, now Pat. No. 7,172,834.

(60) Provisional application No. 60/398,712, filed on Jul. 29, 2002.

(51) Int. Cl.
*H01M 10/40* (2006.01)

(52) U.S. Cl. ........................ 429/188; 429/329; 429/332

(58) Field of Classification Search ................. 429/188, 429/199, 329, 33, 332; 252/519.2
See application file for complete search history.

(56) References Cited

U.S. PATENT DOCUMENTS 5,529,859 A 6/1996 Shu et al.
5,626,981 A 5/1997 Simon et al.
5,714,281 A 2/1998 Naruse et al.
6,506,516 B1 1/2003 Wietelmann et al.
6,783,896 B2 8/2004 Tsujoka et al.

FOREIGN PATENT DOCUMENTS

WO WO 00/00495 A1 * 1/2000

OTHER PUBLICATIONS

Jow, et al. "Nonaqueous Electrolytes for Wide Temperature Range Operations of Li-ion Cells" 11th International Meeting on Lithium Batteries, CA (Jun. 23-28, 2002).
Xu, et al. "LiBOB as Salt for Lithium-Ion Batteries" Electrical and Solid State Letters, 5 (1) A26-A29 (2002).
Xu, et al. "LiBOB and its Derivatives" Electrical and Solid State Letters, 4 (1) E1-E4 (2001).
Jow, et al. "LiBOB as an Electrolyte Salt for Lithium-ion Cells" 42nd1Battery Symposium in Japan, Nov. 21-23, 2001, Yokahama, Japan.

* cited by examiner

*Primary Examiner*—Gregg Cantelmo
(74) *Attorney, Agent, or Firm*—William V. Adams; A. David Spevack; Guy M. Miller

(57) ABSTRACT

A method for enhancing the performance characteristics of a battery through the use of the electrolyte composition comprised of a non-aqueous solvent, and a salt mixture. The salt mixture includes an alkali metal electrolyte salt and an additive salt having an anion of a mixed anhydride of oxalic acid and boric acid. Specific additive salts include lithium bis (oxalato) borate and lithium oxalyldifluoroborate. Particular electrolyte salts comprise LiPF6 and LiBF4. The additive salt is present in an amount of 0.1-60 mole percent of the total of the additive salt and electrolyte salt content of the electrolyte.

1 Claim, 4 Drawing Sheets

NON-AQUEOUS SOLVENT ELECTROLYTE BATTERY WITH ADDITIVE ALKALI METAL SALT OF A MIXED ANHYDRIDE COMBINATION OF OXALIC ACID AND BORIC ACID

RELATED APPLICATION

This patent claims priority of a provisional patent application Ser. No. 60/398,712 filed Jul. 29, 2002, filed as non-provisional application Ser. No. 10/625,686 on 24 Jul. 2003 now U.S. Pat. No. 7,172,834 issued Feb. 6, 2007 and entitled "Lithium Bis(oxalato) Borate as an Additive for Non-aqueous Electrolyte Rechargeable Electrochemical Cells", this parent case was co-pending with the instant divisional application.

GOVERNMENT INTEREST

The invention described herein may be manufactured, used, and licensed by or for the United States Government.

FIELD OF THE INVENTION

The present invention relates generally to electrochemical cells. More specifically, the invention relates to rechargeable batteries. Most specifically, the invention relates to additives for enhancing the performance of rechargeable lithium batteries of the type which include non-aqueous electrolytes.

BACKGROUND OF THE INVENTION

High voltage and high energy density, rechargeable (or secondary) lithium batteries based on non-aqueous electrolytes are widely used in portable devices such as camcorders, notebook computers, and cell phones. This type of battery employs cathodes comprised of lithiated transition metal oxides such as $LiCoO_2$, $LiNiO_2$, $LiMn_2O_4$, and variations of the previous oxides together with dopants; composition and stoichiometry of the cathode materials may vary from the foregoing. Lithium metal, lithium alloys, and carbonaceous materials are candidates as anode materials for these rechargeable lithium batteries. Carbonaceous materials are often preferred over the lithium metal and lithium alloys as anode materials in the commercial rechargeable lithium batteries. This type of lithium battery is called a lithium-ion (Li-ion) battery because no metallic lithium is present in the anode; Li ions are intercalated into and de-intercalated out of carbon materials during charge and discharge processes, respectively. The advantages of such carbon anodes are that they do not have the problems of dendrite growth on the lithium metal which can cause shorting of the cell.

Among the numerous forms of carbon materials useful in lithium-ion anodes, the most energetically favorable are the ones with a crystalline graphene structure, where the lithium ion intercalations can occur at a potential platform close to that of lithium metal, so that the corresponding cell will deliver energy at high and steady cell voltage. For this reason, almost all lithium-ion cell manufacturers/developers focus their efforts on anode materials based on graphite.

Lithium batteries, which term includes lithium ion batteries as well, require an electrolyte to operate, and this electrolyte typically comprises a solvent having an electrolyte salt dissolved therein. The graphite structure is very sensitive to the reduction and co-intercalation of most electrolyte solvents, which can cause disintegration called "exfoliation" which terminates cell operation. Therefore, the selection of solvents depends greatly on the type of carbonaceous materials used in the anode for Li-ion cells. When amorphous or graphitization retardant carbon material is used as anode material, a cyclic ester such as propylene carbonate (PC) is preferably used as the main solvent because this type of carbon is relatively non-sensitive to exfoliation, and PC has such advantages as better oxidative stability, thermal stability, and lower cost, lower melting point over other cyclic esters such as ethylene carbonate (EC). The penalty for this kind of cell chemistry is that amorphous or graphitization retardant carbon anode materials provide a lower energy density for the cells. Therefore, graphitic anode materials are more preferred.

However, it has been found that PC is not a preferred solvent in Li-ion cells when graphites or the kinds of carbons where a crystal structure (graphitization) has been developed are used as anode material. This is because PC molecules co-intercalate along with lithium-ion into the graphene structure and cause severe exfoliation, which subsequently destroys such carbonaceous anodes and yields some gaseous products inside the batteries. These problems not only shorten the life and performance of the batteries, but also raise safety concerns with such batteries because of a build-up of the internal pressure. The above problem can be resolved by using EC as the main solvent in the electrolyte. However, EC has a high melting point of 38° C. and tends to freeze out of the electrolyte at low temperatures.

Therefore, the incompatibility between PC and graphite anodes forces people to choose between a cell of higher energy density and a cell for low temperature operation. To address this problem, different approaches were adopted by researchers to increase the compatibility between PC and graphite anodes, among which the most feasible and popular is the modification of electrolyte solution by using small amount of active agents, or known as additives.

For example, Naruse et al. in U.S. Pat. No. 5,714,281 disclosed an improved non-aqueous electrolyte that employs vinylene carbonate (VC) in mixture with e.g., PC, EC, γ-butyrolactone and other linear chain esters for Li-ion cells having graphite as negative electrode (or anode). Also Simon et al. disclosed in U.S. Pat. No. 5,626,981 that using small amount of VC as an electrolyte additive can effectively suppress PC decomposition and improve the performance of the Li-ion cells with PC-containing electrolytes. This is because VC is decomposed at slightly higher potentials than PC and the resultant solid products form a stable solid electrolyte interphase (SEI), which protects PC from the further decomposition.

Similar to Naruse's approach, many other additive species were disclosed in patents and publications, including $CO_2$, $NO_2$, $SO_2$, crown ethers, chloroethylene carbonate, alkyl sulfite, etc. All the additives proposed so far are molecular compounds, and most of them are either gaseous or toxic. There has never been any ionic compound (salt) that has been found to be useful in this aspect. Moreover, none of the electrolyte solutes used so far for lithium ion batteries can make any improvement in the compatibility between PC and graphite anode.

Therefore, in order to incorporate PC and graphite anode materials into a lithium-ion cell that can perform at low temperature and with high energy density, it is necessary to find an additive that can effectively form a protective SEI on graphite and prevent it from exfoliation. Moreover, it will be more advantageous if the additive found is a salt instead of a molecular compound, because the presence of the ionic additive is safer than molecular compounds in that it has much lower vapor pressure.

According to the present invention, it has been found that graphitic anodes can be stabilized by adding small amount of lithium bis(oxalato) borate (($LiB(C_2O_4)_2$) or LiBOB) or lithium oxalyldifluoroborate ($LiBF_2C_2O_4$) as an additive in the above PC-based electrolytes. In addition, this invention can be generalized to other non-aqueous electrolyte systems such as the electrolyte systems containing solvents other than mixtures of linear or cyclic esters. For example, linear or cyclic ethers or esters may also be included as electrolyte components.

It is known that when a Li-ion cell constructed with any carbonaceous anode material (or negative electrode) is initially charged, some permanent capacity loss occurs due to the anode SEI formation. This permanent capacity loss is called the first cycle irreversible capacity. The SEI formation process, however, is highly dependent on the reactivity of the electrolyte components at the cell charging potentials. The electrochemical properties of the SEI film are also dependent on the chemical composition.

In order to avoid direct deposition of Li metal, Li-ion cells are generally designed to be cathode limited. Since all of the lithium-ions, which shuttle between the anode and the cathode during charging and discharging, originally come from the limited lithiated cathode, the larger the first cycle irreversible capacity, the lower the cell capacity in subsequent cycles. Thus, it is desirable to minimize or even eliminate the first cycle irreversible capacity in Li-ion cells while at the same time maintaining the high cycling capability of such cells at the low temperatures.

When PC-based electrolytes are used with a graphite anode, the first cycle irreversible capacity is much higher than it is for electrolytes without PC. Therefore, to make PC-based electrolytes practical so that lithium-ion cells for low temperature operation can be realized, it is necessary to reduce the first cycle irreversible capacity effectively so that the lithium ion consumed in the formation of SEI is relatively small, and the film thus formed will not be of high impedance. Therefore, there is also a need for an additive whose presence can reduce the first cycle irreversible capacity, and form a conductive SEI.

According to the present invention, it has been found that the first cycle irreversible capacity is reduced by adding small amount of lithium bis(oxalato) borate or lithium oxalyldifluoroborate to the state-of-the-art non-aqueous electrolytes. This is true even for PC-based electrolytes and regardless of whether or not amorphous carbon or graphite anodes are used. Li-ion cells having graphite as a negative electrode, activated with these electrolytes exhibit lower first cycle irreversible capacities relative to the cells activated with the same PC-based electrolyte without the said additive in the present invention. As a result, the cells including lithium bis(oxalato) borate or lithium oxalyldifluoroborate additive present higher subsequent cycling capacity than those without addition of the said additives.

These and other advantages of the present invention will become increasingly more apparent to those skilled in the art by reference to the following description and to the appended drawings.

BRIEF DESCRIPTION OF THE INVENTION

Disclosed herein is a lithium-ion battery of the type which includes a carbon anode disposed in an electrolyte. The electrolyte comprises a non-aqueous solvent having an electrolyte salt dissolved therein. The battery further includes an additive salt disposed in said electrolyte; said additive salt comprises an alkali metal salt of a mixed anhydride of oxalic acid and boric acid. In particular embodiments, the additive is an alkali metal salt of bis(oxalato) borate and/or an alkali metal salt of bifluoroxalato borate. In specific embodiments, the additive salt is present in an amount of 0.1-60 mole percent of the total salt mixture in said electrolyte.

The electrolyte salt is, in specific embodiments, one or more of $LiPF_6$ and $LiBF_4$. The solvent may comprise a non-aqueous solvent which in specific embodiments includes a carbonic acid ester such as dimethyl carbonate, diethyl carbonate, dipropyl carbonate, ethylmethyl carbonate, methylpropyl carbonate, ethylpropyl carbonate and mixtures thereof. The electrolyte may also include a cyclic ester or a cyclic amide, and some particular materials comprise propylene carbonate, ethylene carbonate, butylene carbonate, vinylene carbonate, γ-butyrolactone, N-methylpyrrolidinone and mixtures thereof. The concentration of the electrolyte salt and additive in the electrolyte is typically in the range of 0.3-1.5 moles per liter.

Disclosed herein is an electrolyte for a lithium battery. The electrolyte includes a non-aqueous solvent and a salt mixture comprised of the electrolyte salt and the additive salt of the present invention. Disclosed is a method for enhancing the performance of a lithium-ion battery, which method comprises disposing the additive salt of the present invention in the electrolyte of the battery. Also disclosed is the compound lithium oxalyldifluoroborate.

DESCRIPTION OF THE PREFERRED EMBODIMENTS

Figure 1:
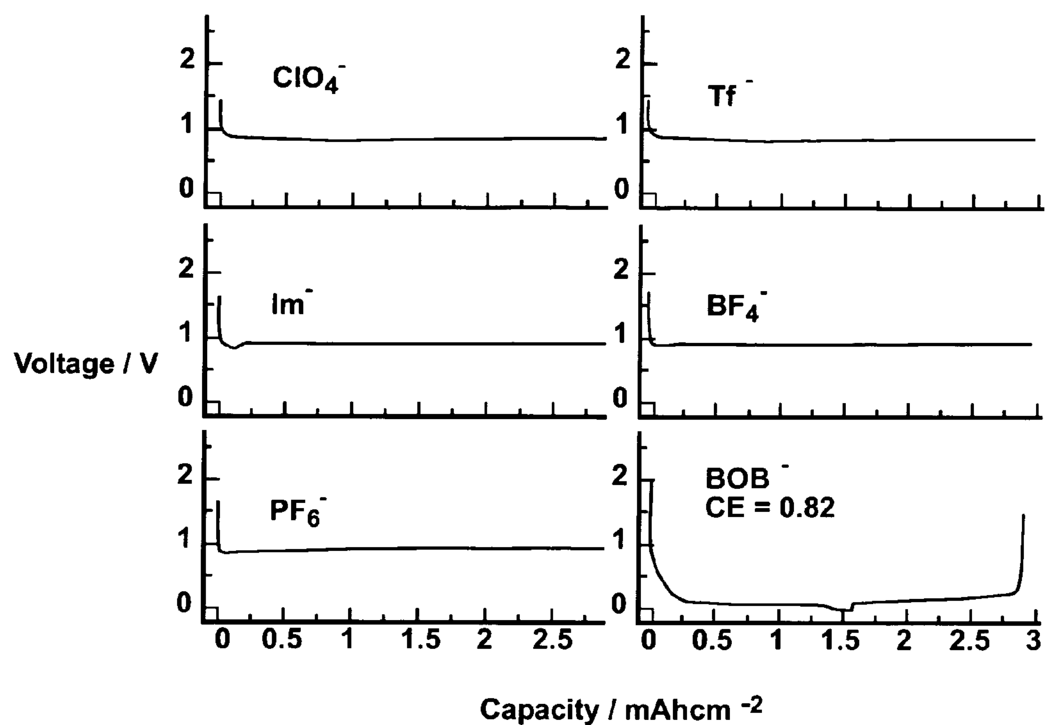
FIG. 1 The first cycle of Li/graphite half-cell in electrolytes comprising of 1.0 m various Li salts in PC.

A secondary electrochemical cell constructed according to the present invention includes an anode (or a negative electrode) comprising a material capable of intercalating and de-intercalating an alkali metal ion, which is preferably a lithium-ion. A carbonaceous anode comprising any of the various forms of carbon (e.g., coke, graphite, acetylene black, carbon black, glassy carbon, etc.), which are capable of reversibly retaining the lithium-ions, is preferred. Graphite is particularly preferred due to its relatively high lithium-retention capacity.

The cathode (or the positive electrode) of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$ and the like doped with a third element and/or a fourth element.

The choice of an electrolyte solvent system for activating an alkali metal electrochemical cell, and particularly a fully charged lithium-ion cell is very limited due to the high potential of the cathode material (up to 4.3V vs. $Li/Li^+$) and the low potential of the anode material (down to 0.01V vs. $Li/Li^+$). According to the present invention, suitable non-aqueous electrolytes are comprised of an inorganic salt dissolved in a non-aqueous solvent mixture and more preferably an alkali metal salt dissolved in a mixture of organic ester solvents comprising dialkyl carbonic acid esters (carbonates) selected from, but not limited to, dimethyl carbonate (DMC), diethyl carbonate (DEC), dipropyl carbonate (DPC), ethylmethyl carbonate (EMC), methylpropyl carbonate (MPC), and ethylpropyl carbonate (EPC), and/or linear alkyl esters selected from, but not limited to, methyl acetate (MA), ethyl acetate (EA), propyl acetate (PA), isopropyl acetate (i-PA), butyl acetate (BA), methyl propionate (MP), ethyl propionate (EP), propyl propionate (PP), isopropyl propionate (i-PP), methyl butyrate (MB), ethyl butyrate (EB), propyl butyrate (PB), isopropyl butyrate (i-PB), and mixtures thereof, and at least one cyclic ester selected from propylene carbonate (PC), ethylene carbonate (EC), butylene carbonate (BC) and vinylene carbonate (VC), γ-butyrolactone (γ-BL), or cyclic amides such as N-methylpyrrolidinone (NMP), and mixtures thereof. Organic esters are generally used in the electrolyte solvent system for such battery chemistries because they exhibit high oxidative stability toward cathode materials and good kinetic stability toward anode materials.

Known lithium salts that are useful as an electrolyte salt in the solvent systems as described above include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, LiSCN, $LiO_3SCF_2CF_3$, $LiO_3SC_6F_5$, $LiO_2CCF_3$, $LiB(C_6H_5)_4$, and $LiCF_3SO_3$, and mixtures thereof. Suitable salt concentrations typically range between about 0.3 to 1.5 molar/liter.

The electrolyte according to the present invention contains at least one of the additives in the solvent systems and electrolyte salt mentioned above. The additives of the present invention include lithium bis(oxalato) borate (($LiB(C_2O_4)_2$) or LiBOB), lithium oxalyldifluoroborate ($LiBF_2C_2O_4$), and the lithium salts with the anion containing oxalato and boric moieties such as $C_2O_4^{2-}$, $C_2O_4R_2$, $BO_2^-$, $B(OR)_3$, and the compounds that contains any combination of the two moieties, especially the mixed anhydride between oxalic and boric acid. The structures of bis(oxalato) borate and oxalyldifluoroborate anions are shown below:

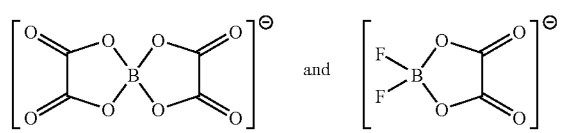

The structures of mixed anhydride between oxalic and boric acid are shown below:

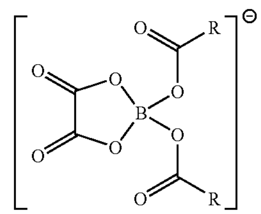

where R could be hydrogen, alkyl, halogen, halogenated alkyl, carbonyl or carboxyl.

The advantage of using these additives is that they promote the formation of a protective layer or solid electrolyte interphase (SEI) on the carbonaceous anode material during the first charging process. This SEI can effectively protect the graphite anode in PC-based electrolytes, so that the lithium ion cells using such electrolytes are stable and have a wide operating temperature range. Furthermore, the irreversible capacity consumed to form this SEI is much reduced due to the presence of the additives of this invention. Still furthermore, the addition of the additives of the present invention achieves the above improvements without requiring major electrolyte reformulation, so that the merits of the existing electrolyte systems, such as high ion conductivity, high power, and low capacity fading, will not be negatively impacted.

The most prevalent electrolyte salt used in Li-ion cells today is $LiPF_6$ while $LiBF_4$ is well known but is not as widely used. In addition to these two, other salts, including $LiClO_4$, $LiC(SO_2CF_3)_3$, $LiN(SO_2CF_3)_2$, $LiO_3SCF_2CF_3$, $LiO_3SC_6F_5$, $LiO_2CCF_3$, $LiB(C_6H_5)_4$, and $LiCF_3SO_3$ etc. have also been considered to be used as electrolyte solutes for lithium-ion batteries. However, none of these salts that were tested so far shows any positive impact on the compatibility between PC and graphite materials, or on the improvement of the first cycle irreversible capacities. Normally, researchers skilled in the field do not expect that the use of a salt would achieve the benefits of the present invention.

The salt or salt additives of the present invention are found to have the unexpected properties of forming an SEI that (1) effectively protects graphite anode materials in PC and (2) effectively reduces the first cycle irreversible capacities, as it will be shown graphically and more clearly through the examples and figures.

The most preferred content of the salt additive is 0.1-60 mole percent versus the total alkali metal salts. Most preferred weight percent ranges for the various ester solvents include PC in the range of about 0 to about 60%; γBL in the range of about 0 to 60%, EC in the range of about 10 to about 60%; linear carbonates and esters, such as DMC, DEC, EMC, MA, MP, MB, or mixture thereof, in the range of 0% to about 80%. The PC-based electrolytes thus formulated exhibit lower freezing points, and lithium-ion cells activated with such electrolytes have good charge/discharge cycling behavior at temperatures below −20° C.

The present invention will be illustrated by referring to the following examples hereinafter, but the present invention is by no way limited by these examples. To help the illustration of the examples, a number of control electrolytes as designated by letters A, B, C, etc. with different solvent combinations as shown below are used.

Electrolyte A: 1 m $LiBF_4$ in PC-EC-EMC (1:1:3 wt. ratio)
Electrolyte B: 1 m $LiPF_6$ in PC-EC-EMC (1:1:3 wt. ratio)
Electrolyte C: 1 m $LiBF_4$ in PC-EC (1:1 wt. ratio)
Electrolyte D: 1 m $LiPF_6$ in PC
Electrolyte E: 1 m $LiPF_6$ in PC-EC (1:1 wt. ratio)
Electrolyte F: 1 m $LiPF_6$ in PC-EC-EMC (3:3:4 wt. ratio)

The examples are for illustrative purpose and the spirit of the invention is no means limited by them.

EXAMPLE 1

Effect of LiBOB on SEI of graphite in Neat PC Solution

The neat PC solutions of various Li salts, including the most popular $LiPF_6$ and $LiBF_4$, were tested in Li/graphite half-cells using a graphite electrode area of 1.27 $cm^2$. The cells were galvanotatically cycled by first discharging (i.e., intercalating Li ion into graphite from a Li electrode or lithiation) at 0.1 $mA/cm^2$ to 0.002 V and then charging (de-intercalating Li ion from graphite or de-lithiation) from 0.002 V to 1.0 V. The results are compared with the neat PC solution of LiBOB in FIG. 1. Apparently, none of the conventional Li salts can form an effective SEI film that prevents the exfoliation of graphite occurring at ca. 0.7~0.8 V, and lithium ion intercalation can never occur in these electrolytes.

However, the salt that is chosen as the salt additive of this invention, LiBOB, successfully formed such an SEI, as evidenced by the reversible lithium ion intercalation and de-intercalation. This unexpected stabilization of graphite in PC is achieved for the first time by a salt.

Since neat LiBOB has drawbacks such as lower solubilities and lower conductivities in electrolyte solutions than $LiPF_6$, this invention uses it only in small amount (0.1 to about 60%) so that its negative impacts will be minimized.

EXAMPLE 2

Effect of LiBOB on Li/Graphite Half-Cells in Electrolyte A, 1 m $LiBF_4$ in PC-EC-EMC (1:1:3 wt. ratio)

Figure 2:
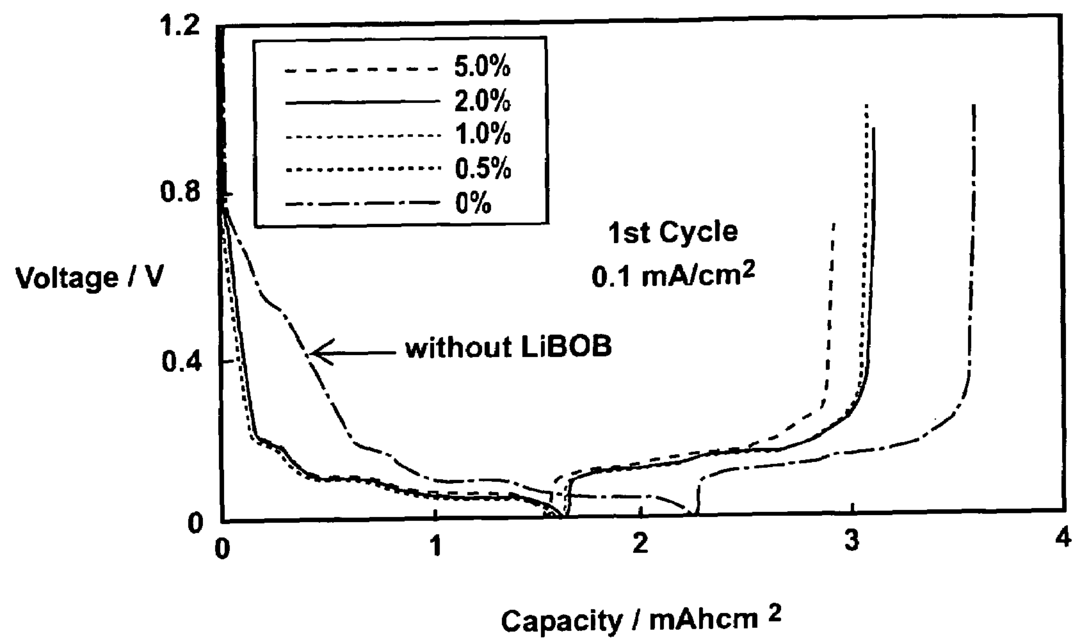
FIG. 2 The first cycle of Li/graphite half-cell in Electrolyte A (1 m $LiBF_4$ in PC-EC-EMC (1:1:3 wt. ratio)) and in Electrolyte A containing 0.5, 1.0, 2.0, and 5.0 m/o of LiBOB, respectively. The total salt concentration was maintained at 1.0 m.

The half-cells are made of Li metal as one electrode and graphite as the other electrode with a graphite electrode area of 1.27 $cm^2$. These cells were each assembled and filled with 150 micro-liter (μL) of Electrolyte A or Electrolyte A containing different contents of LiBOB. The cells were galvanotatically cycled by first discharging (i.e., intercalating Li ion into graphite from Li electrode or lithiation) at 0.1 $mA/cm^2$ to 0.002 V and then charging (de-intercalating Li ion from graphite or de-lithiation) from 0.002 V to 1.0 V. The subsequent cycles were made between 1.0 V and 0.002 V. The coulombic efficiency of the cycling is defined as the ratio of charge capacity to discharge capacity. The cell without LiBOB showed a rather low coulombic efficiency of 54.1% at the first cycle, while the cells containing more than 0.5 mole percent (m/o) of LiBOB showed much higher cycling efficiencies (85-92%, as shown in Table 1 and in FIG. 2) at the first cycle.

TABLE 1

| Electrolyte | Cell Capacity of $1^{st}$ Delithiating, $mAh/cm^2$ | Coulombic Efficiency (%) of $1^{st}$ Cycle |
|---|---|---|
| 1 m $LiBF_4$ in PC-EC-EMC (1:1:3) | 1.32 | 54.1 |
| (0.995 m $LiBF_4$ + 0.005 m LiBOB) in PC-EC-EMC (1:1:3) | 1.43 | 86.6 |
| (0.99 m $LiBF_4$ + 0.01 m LiBOB) in PC-EC-EMC (1:1:3) | 1.46 | 90.4 |
| (0.98 m $LiBF_4$ + 0.02 m LiBOB) in PC-EC-EMC (1:1:3) | 1.48 | 90.6 |
| (0.95 m $LiBF_4$ + 0.05 m LiBOB) in PC-EC-EMC (1:1:3) | 1.39 | 89.5 |

In the second cycle, all the cells having 0.5 m/o and more than 0.5 m/o LiBOB in Electrolyte A achieved 99% coulombic efficiency. In the subsequent cycles, these cells cycled at a rate of 0.5 $mA/cm^2$ showed nearly 100% coulombic efficiency.

EXAMPLE 3

Effect of LiBOB on the Li-Ion Cells Made with a Graphite Anode and a Li Nickel Based Complex Oxide Cathode in Electrolyte A, 1 m $LiBF_4$ in PC-EC-EMC (1:1:3 wt. ratio)

The Li-ion cells with the anode and cathode areas of 1.27 $cm^2$ and 0.97 $cm^2$, respectively, were assembled. Each cell was filled with 150 μL of Electrolyte A or Electrolyte A containing different contents of LiBOB. The cells were first charged to 4.2 V at a rate of 0.1 $mA/cm^2$ and then discharged to 2.7 V at the same rate. The cells were cycled continuously at the same conditions. As shown in Table 2, the cells in Electrolyte A with 1.0 m/o or less of LiBOB had coulombic efficiency of less than 50%, while the cells in Electrolyte A containing 2.0 m/o or more of LiBOB presented coulombic efficiencies of 77-84%.

TABLE 2

| Electrolyte | Irreversible Capacity, $1^{st}$ Cycle, $mAh/cm^2$ | Reversible Capacity, $1^{st}$ Discharge, $mAh/cm^2$ | Coulombic Efficiency (%) at $1^{st}$ Cycle |
|---|---|---|---|
| 1 m $LiBF_4$ in PC-EC-EMC (1:1:3) | 1.04 | 0.85 | 45 |
| (0.99 m $LiBF_4$ + 0.01 m LiBOB) in PC-EC-EMC (1:1:3) | 0.92 | 0.92 | 46 |
| (0.98 m $LiBF_4$ + 0.02 m LiBOB) in PC-EC-EMC (1:1:3) | 0.38 | 1.27 | 77 |
| (0.95 m $LiBF_4$ + 0.05 m LiBOB) in PC-EC-EMC (1:1:3) | 0.26 | 1.38 | 84 |

The rather low cycling efficiencies in the first cycle are known to arise from the decomposition of the electrolyte components, which results in the formation of a surface layer on both electrodes.

EXAMPLE 4

Effect of LiBOB on Li-Ion Cells in Electrolyte B, 1 m $LiPF_6$ in PC-EC-EMC (1:1:3 wt. ratio)

The same Li-ion cells as described in Example 3 were assembled. However, each cell was filled with Electrolyte B or Electrolyte B with 5 m/o of LiBOB. The cells were galvanotatically cycled at 0.1 $mA/cm^2$ between 2.7 V and 4.2 V.

In the first cycle, the cell using Electrolyte B with 5 m/o LiBOB achieved a coulombic efficiency of 83.9% while the cell using Electrolyte B alone achieved only 68.4% coulombic efficiency. This result demonstrates that, with the addition of 5 m/o of LiBOB, the irreversible capacity in the first charging process of the Li-ion cells can be reduced in PC containing electrolytes.

EXAMPLE 5

Effect of LiBOB on Li/Graphite Half-Cells in Electrolyte C, 1 m $LiBF_4$ in PC-EC (1:1 wt. ratio)

Figure 3:
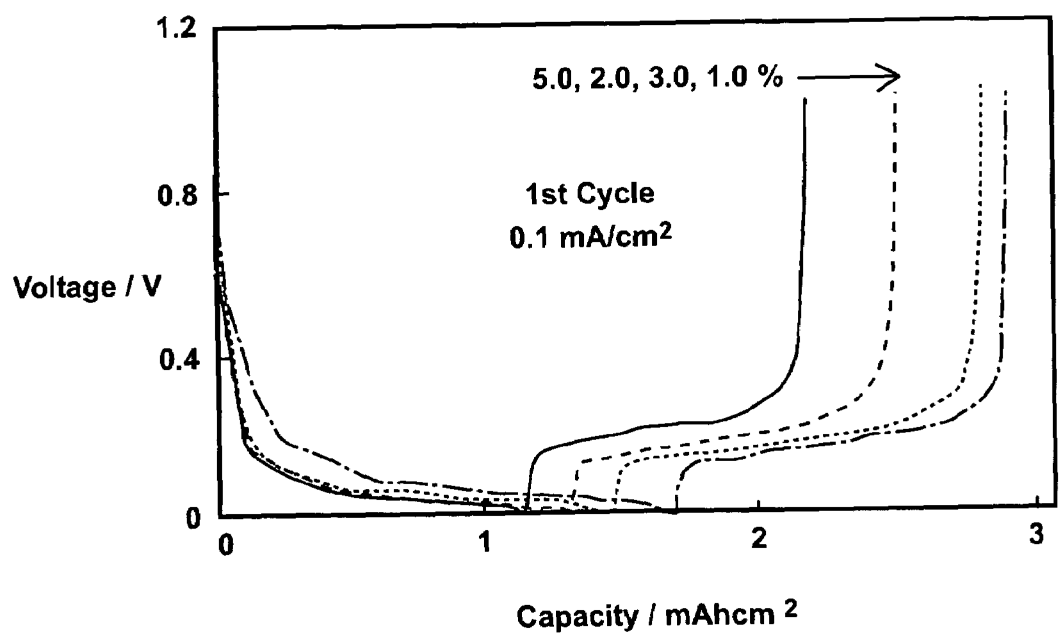
FIG. 3 The first cycle of Li/graphite half-cell in Electrolyte C (1 m $LiBF_4$ in PC-EC (1:1 wt. ratio)) and in Electrolyte C containing LiBOB of 1.0, 2.0, 3.0 and 5.0 m/o, respectively. The total salt concentration was maintained at 1.0 m.

The same cells as described in Example 2 were assembled. However, each of these cells was filled with Electrolyte C or Electrolyte C with different content of LiBOB. These cells were galvanotatically cycled at 0.1 mA/cm$^2$ between 1.0 V and 0.002 V. It was found that the control cell without LiBOB was unable to be cycled due to PC decomposition. As shown in Table 3 and FIG. 3, all other cells having Electrolyte C with 2.0-5.0 m/o of LiBOB exhibited lithiation and delithiation cycle with irreversible capacities that varied from 0.16 to 0.14 mAh/cm$^2$. These irreversible capacities are caused by the decomposition of electrolyte components and known to be essential for the formation of SEI film on graphite surface. The reversible capacity (or the de-lithiation capacity) is also listed. In the second cycle, the cell having Electrolyte C containing 2.0 m/o of LiBOB exhibited a coulombic efficiency over 99%.

TABLE 3

| Electrolyte | Irreversible Capacity, 1$^{st}$ cycle, mAh/cm$^2$ | Reversible Capacity, mAh/cm$^2$ | Coulombic Efficiency, % |
|---|---|---|---|
| 1 m $LiBF_4$ in PC-EC (1:1) | Cannot pass 0.6 V | | — |
| (0.99 m $LiBF_4$ + 0.01 m LiBOB) in PC-EC (1:1) | 0.567 | 1.58 | 73.6 |
| (0.98 m $LiBF_4$ + 0.02 m LiBOB) in PC-EC (1:1) | 0.157 | 1.51 | 90.6 |
| (0.97 m $LiBF_4$ + 0.03 m LiBOB) in PC-EC (1:1) | 0.167 | 1.71 | 91.1 |
| (0.95 m $LiBF_4$ + 0.05 m LiBOB) in PC-EC (1:1) | 0.147 | 1.31 | 89.9 |

EXAMPLE 6

Effect of LiBOB on the Half-Cells with a Li Metal Anode and a Li Nickel Based Complex Oxide Cathode, in Electrolyte C, 1 m $LiBF_4$ in PC-EC (1:1 wt. ratio)

The half-cells made of Li metal and Li nickel based complex oxide as cathode with a cathode area of 0.97 cm$^2$ were assembled. Each of these cells was filled with 150 μL of Electrolyte C containing different content of LiBOB. The cells were galvanotatically cycled at 0.1 mA/cm$^2$ between 2.7 V and 4.3 V. Table 4 shows that the first discharging capacity and coulombic efficiency of the first discharge of the above cells in different electrolytes.

TABLE 4

| Electrolyte | 1$^{st}$ Discharging Capacity, mAh/cm$^2$ | Coulombic Efficiency of 1$^{st}$ Cycle, % | Coulombic Efficiency, 2$^{nd}$ Cycle, % |
|---|---|---|---|
| (0.99 m $LiBF_4$ + 0.01 m LiBOB) in PC-EC (1:1) | 1.36 | 82.8 | 99-100 |
| (0.98 m $LiBF_4$ + 0.02 m LiBOB) in PC-EC (1:1) | 1.49 | 84.7 | 99-100 |
| (0.97 m $LiBF_4$ + 0.03 m LiBOB) in PC-EC (1:1) | 1.57 | 85.4 | 99-100 |
| (0.95 m $LiBF_4$ + 0.05 m LiBOB) in PC-EC (1:1) | 1.52 | 84.5 | 99-100 |

The results show that the cells with different content of LiBOB can be cycled with nearly the same coulombic efficiencies, which means that LiBOB has no adverse impact on the lithium nickel-based mixed oxide cathode.

EXAMPLE 7

Effect of LiBOB on Li-Ion Cells in Electrolyte C, 1 m $LiBF_4$ in PC-EC (1:1 wt. ratio)

The Li-ion cells as described in Example 3 were assembled. Each of these cells was filled with Electrolyte C or a similar electrolyte with different content of LiBOB. These cells were galvanotatically cycled at 0.1 mA/cm$^2$ between 2.7 V and 4.2 V. It was found that the cell with no LiBOB in the electrolyte could not be cycled at all due to PC decomposition, as indicated by a 0% coulombic efficiency. The cell with 1.0 mole % of LiBOB only cycled at 1.74% efficiency, which for all practical purposes is the same as not cycling, while those containing more than 2.0 mole % of LiBOB were able to charge and discharge. The cycling efficiencies of these cells depended on the content of LiBOB in the electrolytes as shown in Table 5. The coulombic efficiencies of the Li-ion cells in Electrolyte C containing 2 and more m/o LiBOB reached almost 100% at the second cycle.

TABLE 5

| Li-ion performance in Electrolyte C with and without addition of LiBOB | | |
|---|---|---|
| Electrolyte | 1$^{st}$ Discharge capacity, mAh/cm$^2$ | Coulombic Efficiency, 1$^{st}$ cycle, % |
| 1 m $LiBF_4$ in PC-EC (1:1) | 0 | 0 |
| (0.99 m $LiBF_4$ + 0.01 m LiBOB) in PC-EC (1:1) | 3.1E−5 | 1.74 |
| (0.98 m $LiBF_4$ + 0.02 m LiBOB) in PC-EC (1:1) | 1.395 | 84.6 |
| (0.97 m $LiBF_4$ + 0.03 m LiBOB) in PC-EC (1:1) | 1.351 | 82.6 |
| (0.95 m $LiBF_4$ + 0.05 m LiBOB) in PC-EC (1:1) | 1.393 | 84.1 |

EXAMPLE 8

Effect of LiBOB on Anode Half-Cells with Electrolyte D, 1 m $LiPF_6$ in PC

Figure 4:
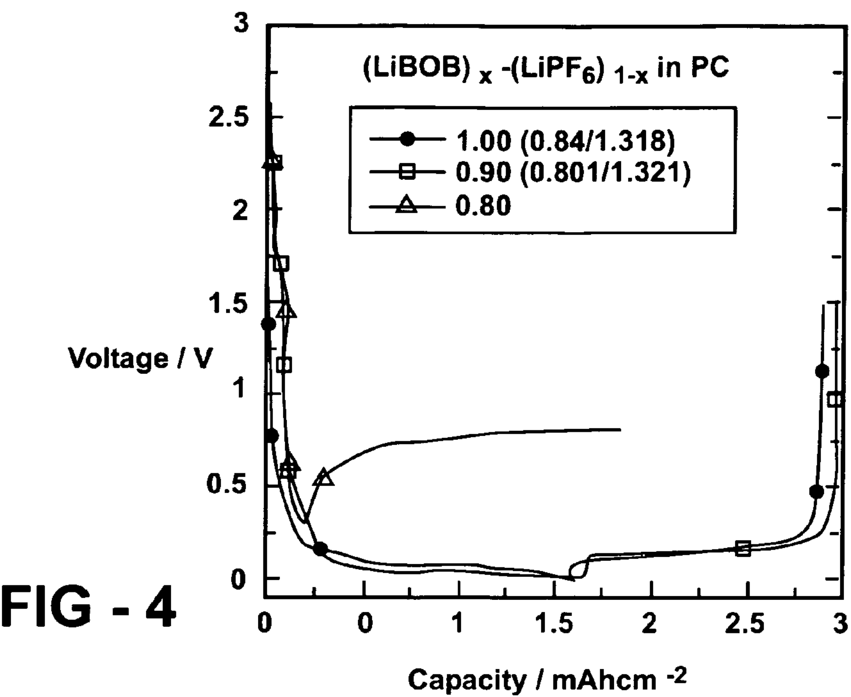
FIG. 4 The first cycle of Li/graphite half-cell in Electrolyte D (1.0 m $LiPF_6$ in PC) and in Electrolyte D containing 80, 90, 100 m/o of LiBOB, respectively. The total salt concentration of the salts was maintained at 1.0 m.

The half-cells as described in Example 2 were assembled. Each of these cells was filled with Electrolyte D with different content of LiBOB. These cells were galvanotatically cycled at 0.01 mA/$cm^2$ between 1.5 V and 0.01 V. It was found that the cell having no LiBOB in its electrolyte could not be cycled at all due to PC decomposition, as indicated by a 0% coulombic efficiency. The exfoliation of graphite cannot be prevented in the PC electrolyte until the LiBOB concentration reaches 90%. The cycling efficiencies depend on the content of LiBOB in the electrolytes as shown in Table 6 and FIG. 4. The coulombic efficiencies of the half-cells in Electrolyte D containing 90 and 100 mol % LiBOB reached almost 100% at the second cycle.

TABLE 6

Half Anode Cell performance in Electrolyte D with and without addition of LiBOB

| Electrolyte | 1st Discharge capacity, mAh/$cm^2$ | Coulombic Efficiency of 1st cycle, % |
|---|---|---|
| 1 m $LiPF_6$ in PC | 0 | 0 |
| (0.2 m $LiPF_6$ + 0.8 m LiBOB) in PC | 0 | 0 |
| (0.1 m $LiPF_6$ + 0.9 m LiBOB) in PC | 1.321 | 80.1 |
| 1 m LiBOB in PC | 1.318 | 84 |

EXAMPLE 9

Effect of LiBOB on Anode Half Cells with Electrolyte E, 1 m $LiPF_6$ in PC-EC (1:1)

Figure 5:
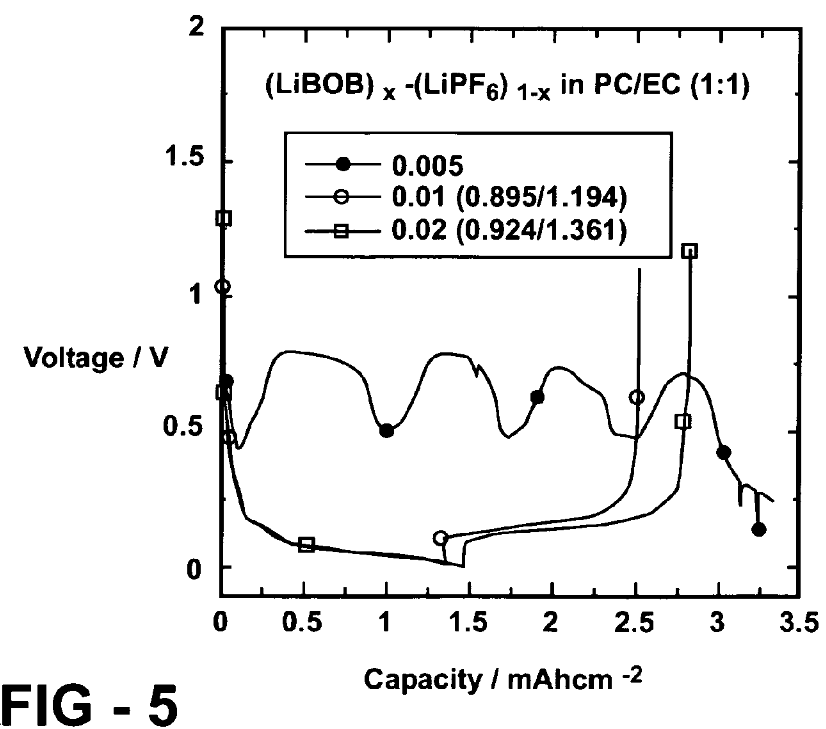
FIG. 5 The first cycle of Li/graphite half cell in Electrolyte E (1.0 m $LiPF_6$ in PC/EC 1:1) containing 0.5, 1.0, and 2.0 m/o of LiBOB, respectively. The total salt concentration of the salts was maintained at 1.0 m.

The half-cells as described in Example 2 were assembled. Each of these cells was filled with Electrolyte E containing different concentrations of LiBOB. These cells were galvanotatically cycled at 0.01 mA/$cm^2$ between 1.5 V and 0.01 V. It was found that the cell having an electrolyte with no LiBOB could not be cycled at all due to PC decomposition, as indicated by a 0% coulombic efficiency. The exfoliation of graphite is prevented in the PC-rich electrolyte until the LiBOB concentration reaches 1%. The cycling efficiencies depend on the content of LiBOB in the electrolytes as shown in Table 7 and FIG. 5. The coulombic efficiencies of the half-cells in Electrolyte D containing 1 mol % and more LiBOB reached almost 100% at the second cycle.

TABLE 7

Half Anode Cell performance in Electrolyte E with and without addition of LiBOB

| Electrolyte | 1st Discharge capacity, mAh/$cm^2$ | Coulombic Efficiency of 1st cycle, % |
|---|---|---|
| 1 m $LiPF_6$ in PC-EC (1:1) | 0 | 0 |
| (0.995 m $LiPF_6$ + 0.005 m LiBOB) in PC-EC (1:1) | 0 | 0 |
| (0.99 m $LiPF_6$ + 0.01 m LiBOB) in PC-EC (1:1) | 1.194 | 89.5 |
| (0.98 m $LiPF_6$ + 0.02 m LiBOB) in PC-EC (1:1) | 1.361 | 92.4 |

EXAMPLE 10

Effect of LiBOB on Anode Half-Cells with Electrolyte F, 1 m $LiPF_6$ in PC-EC-EMC (3:3:4 wt. ratio)

Figure 6:
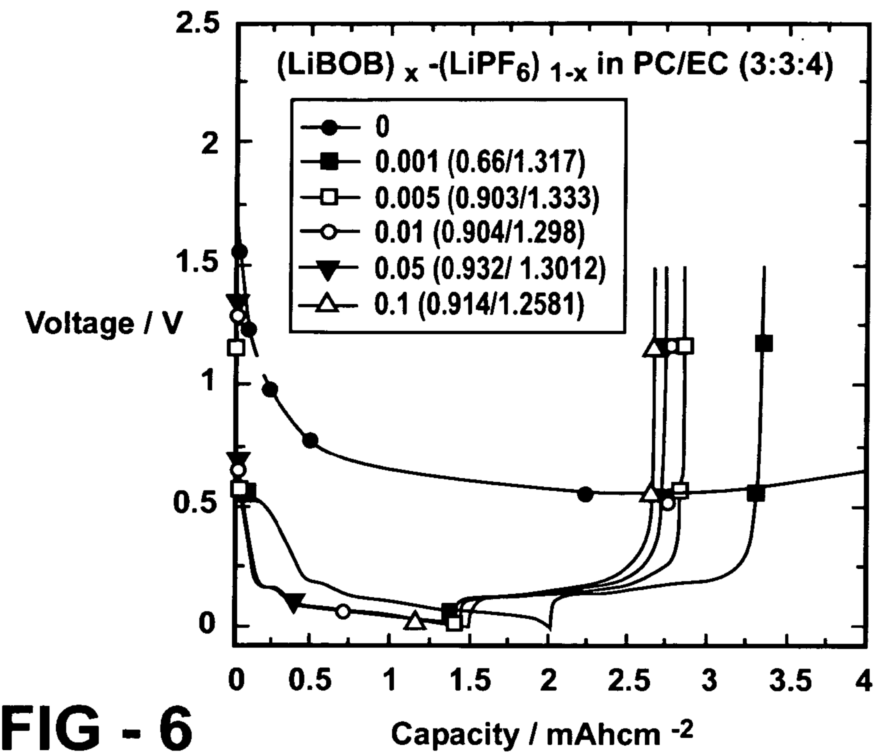
FIG. 6 The first cycle of Li/graphite half-cell in Electrolyte F (1.0 m $LiPF_6$ in PC-EC-EMC 3:3:4) with 0.1, 0.5, 1.0, 5.0, and 10 m/o of LiBOB, respectively. The total salt concentration of the salts was maintained at 1.0 m.

The half-cells as described in Example 2 were assembled. Each of these cells was filled with Electrolyte E with different concentrations of LiBOB. These cells were galvanotatically cycled at 0.01 mA/$cm^2$ between 1.5 V and 0.01 V. It was found that the cell in which the electrolyte contained no LiBOB could not be cycled at all due to PC decomposition, as indicated by a 0% coulombic efficiency. The exfoliation of graphite is prevented in the PC-rich electrolyte when the LiBOB concentration reaches 0.1% or higher. The cycling efficiencies depend on the content of LiBOB in the electrolytes as shown in Table 8 and FIG. 6. The coulombic efficiencies of the half-cells in Electrolyte F containing 0.1 mol % and more LiBOB reached almost 100% at the second cycle.

TABLE 8

Half Anode Cell performance in Electrolyte F with and without addition of LiBOB

| Electrolyte | 1st Discharge capacity, mAh/$cm^2$ | Coulombic Efficiency of 1st cycle, % |
|---|---|---|
| 1 m $LiPF_6$ in PC-EC-EMC (3:3:4) | 0 | 0 |
| (0.999 m $LiPF_6$ + 0.001 m LiBOB) in PC-EC-EMC (3:3:4) | 1.317 | 66 |
| (0.995 m $LiPF_6$ + 0.005 m LiBOB) in PC-EC-EMC (3:3:4) | 1.333 | 90.3 |
| (0.99 m $LiPF_6$ + 0.01 m LiBOB) in PC-EC-EMC (3:3:4) | 1.298 | 90.4 |
| (0.95 m $LiPF_6$ + 0.05 m LiBOB) in PC-EC-EMC (3:3:4) | 1.301 | 93.2 |
| (0.90 m $LiPF_6$ + 0.10 m LiBOB) in PC-EC-EMC (3:3:4) | 1.258 | 91.4 |

EXAMPLE 11

Figure 7:
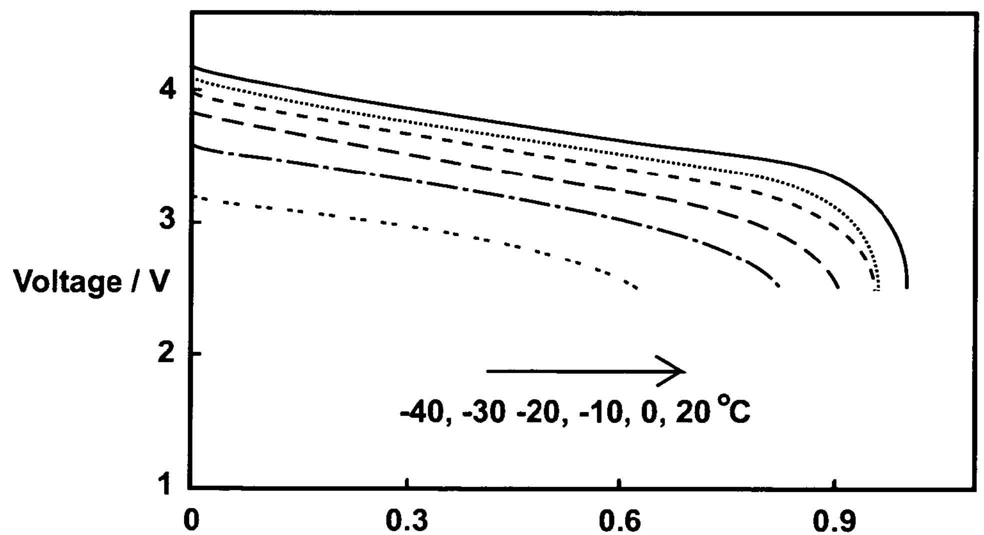
FIG. 7 Cycling performance of graphite/cathode Li-ion cell with Electrolyte A containing 2.0 m/o of LiBOB at low temperatures.

Low Temperature Cycling Performance of Li-Ion Cell with Electrolyte A Containing 2.0 m/o of LiBOB A Li-ion cell with the same configuration as described in Example 3 was assembled and filled with Electrolyte A, 1 m $LiBF_4$ in PC-EC-EMC (1:1:3 wt. ratio), with 2.0 m/o of LiBOB. The cell was cycled between 2.5 and 4.2 V at a current density of 0.5 mA/$cm^2$. The cell was initially cycled at room temperature for 10 times. The cell was then charged to 4.2 V before cooled to 0° C. The discharge capacity was measured after the cell was equilibrated at 0° C. The cell was then charged to 4.2 V after the temperature of the cell was warmed to room temperature again. This process was repeated for the discharge capacity measurements at −10, −20, −30, and −40° C. The voltage profiles of this cell versus the ratio of the discharge capacity at different temperatures relative to discharge capacity at 20° C. are plotted and shown in FIG. 7. We found that discharge capacity of the cell delivered 63% of the capacity at room temperature (20° C.) at −40° C. and 83% of the capacity at room temperature at −30° C.

While the present invention was discussed with reference to lithium ion batteries, the invention may also be used in connection with lithium batteries of other types; and within the context of this disclosure and claims, all such batteries are included within the term “lithium batteries.” It is to be understood that the foregoing discussion, description and data are illustrative of particular embodiments of this invention, but are not meant to be a limitation on the practice thereof. Other modifications and variations of the invention will be apparent to one of skill in the art in view of the foregoing. It is the following claims, including all equivalents, which define the scope of the invention.

The invention claimed is:

1. A battery which includes an electrolyte comprising:

a non-aqueous solvent; and a salt mixture, said salt mixture consisting of an alkali metal electrolyte salt and an additive salt combination consisting of a first additive salt of bis(oxalato) borate and a second additive salt oxalyldifluoroborate.

* * * * *